UNITED STATES PATENT OFFICE.

DION L. JOHNSON, OF LOS ANGELES, CALIFORNIA.

PROCESS FOR PRODUCING MOLYBDENUM DISULFID.

1,248,867.     Specification of Letters Patent.     Patented Dec. 4, 1917.

No Drawing.     Application filed July 7, 1917. Serial No. 179,237.

*To all whom it may concern:*

Be it known that I, DION L. JOHNSON, a citizen of the United States, residing at Los Angeles, in the county of Los Angeles, State of California, have invented a new and useful Process for Producing Molybdenum Disulfid, of which the following is a specification.

My invention relates to the art of refining metallic salts and more particularly to the art of refining oxidized salts to produce sulfids. More particularly, it refers to a process for recovering molybdenum disulfid from sodium molybdate or from other oxidized molybden salts.

It is a common practice to produce from wulfenite or other molybdenum ores, an impure sodium molybdate commercially and hereinafter called somol. Somol chemically consists of $Na_2MoO_4$, with which are usually mixed carbonates, sulfates, phosphates, arsenates and other sodium compounds. This somol is commonly commercially reduced in the electric furnace, but such reduction processes are troublesome and expensive due to the fact that the sodium compounds and the sodium content of the somol are corrosive and destructive of furnace linings and electrodes.

One of the main objects of my invention is to provide a process by which a disulfid of molybdenum may be recovered from somol by using moderate temperatures. So far as I am aware, there exists no known process by which the disulfid of molybdenum may be artificially produced, although it is found in an impure state in nature in an ore known as molybdenite.

A further object of the process is to produce a disulfid of molybdenum which is free from impurities, commonly associated with it in nature and which are deleterious to its further use, such as phosphorus, arsenic, and other materials.

It is a further object of my invention to also separate from the final product certain of the impurities, commonly found in somol. In my process the commercial somol is mixed with sulfur, both materials being in their dry state. The mixture must be very complete and the materials must be sufficiently broken up so that an intimate mixture may be produced. I prefer to mix the sulfur with the somol in such a proportion that there will be present in the final mixture 7 atoms of sulfur to 2 molecules of molybdenum trioxid, the chemical relation of this mixture being $2MoO_3+7S$. In practice, I prefer to use approximately 250 parts by weight of sulfur to 290 parts of molybdenum trioxid. These proportions are of course approximate and may vary considerably without departing from the spirit of my invention. The intimately mixed mass of material is then subjected to a minimum heat of approximately 500 degrees centigrade. During the heating of this mass, a chemical reaction takes place which may be expressed as follows:

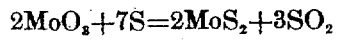
$$2MoO_3+7S=2MoS_2+3SO_2$$

The $SO_2$ produced combines with the sodium oxid base $Na_2O$ to produce sodium sulfite $Na_2SO_3$. The final mass consists of the disulfid of molybdenum, the sodium sulfite, and various impurities which were originally in the somol. The mass after being heated and at the completion of the reaction, consists of a porous and spongy mass or frit, which breaks up, and disintegrates, when placed in water, the sodium sulfite and the impurities of the somol passing into solution in the water. The disulfid of molybdenum is insoluble and may be readily filtered out, and forms the desired commercial product.

In the reduction of somol in the electric furnace by the present methods for the purpose of producing ferro-molybdenum practically all the phosphorus originally in the ore from which the somol was made appears in the ferro-molybdenum together with a considerable portion of the arsenic. As both arsenic and phosphorus are highly objectionable in steel making where the present methods are used, great care must be exercised in the selection of the raw material for the furnace so that the proportion of arsenic and phosphorus in the ferro-molybdenum is kept low. In practice in steel making the phosphorus percentage is measured to three decimal places and the proportion is watched very carefully as a high proportion of phosphorus ruins the steel. Due to these facts large bodies of molybdenum ore, high in phosphorus and arsenic, have hitherto been unavailable for the production of somol which it is intended to later use in the electric furnace in the production of ferro-molybdenum. By my process it is possible to utilize very impure somol to produce molybdenum disulfid which is free from objectionable impurities, particularly phosphorus and arsenic, this molybdenum disulfid being readily reduced in the electric furnace to produce a ferro-molybdenum of great purity. My process therefore makes available large bodies of molybdenum ores which are high in phosphorus, arsenic, or other impurities and which are at present unworkable by any commercially known process.

I claim as my invention:—

1. The process of producing molybdenum sulfid from sodium molybdate which comprises finely dividing the molybdate; intimately mixing said molybdate with finely divided sulfur; in the approximate proportion of 290 pounds of molybdenum trioxid content to 250 pounds of sulfur; and subjecting the mixture to the action of heat.

2. The process of producing molybdenum sulfid from sodium molybdate which comprises finely dividing the molybdate; intimately mixing said molybdate with finely divided sulfur; in the approximate proportion of 290 pounds of molybdenum trioxid content to 250 pounds of sulfur; and subjecting the mixture to a heat of at least 500 degrees centigrade.

3. The process of separating molybdenum from somol containing phosphorus, arsenic, or other objectionable elements which comprises finely dividing the somol; intimately mixing the somol with free sulfur; subjecting the mixture to the action of heat for the purpose of producing a water insoluble molybdenum disulfid and thereafter removing all soluble matter including objectionable phosphorus and arsenic compounds from the mixture by leaching.

4. The process of claim 6 in which the heating step is carried on at about 500 degrees centigrade.

5. The process of claim 6 in which the mixture is in the approximate proportion of 290 pounds of molybdenum trioxid content to 250 pounds of sulfur.

6. The process of separating molybdenum from somol containing phosphorus, arsenic or other objectionable elements which comprises finely dividing the somol; intimately mixing the somol with free sulfur in the approximate proportion of 290 pounds of molybdenum trioxid content to 250 pounds of sulfur; subjecting the mixture to a temperature of about 500 degrees centigrade for the purpose of producing a water insoluble molybdenum disulfid and thereafter removing all phosphorus and arsenic compounds from the mixture by leaching.

In testimony whereof, I have hereunto set my hand at Los Angeles, California, this 28th day of June, 1917.

DION L. JOHNSON.

It is hereby certified that in Letters Patent No. 1,248,867, granted December 4, 1917, upon the application of Dion L. Johnson, of Los Angeles, California, for an improvement in "Processes for Producing Molybdenum Disulfid," an error appears in the printed specification requiring correction as follows: Page 2, lines 40 and 43, claims 4 and 5, for the numeral "6" read *3;* and that the said Letters Patent should be read with this correction therein that the same may conform to the record of the case in the Patent Office.

Signed and sealed this 26th day of March, A. D., 1918.

[SEAL.]

R. F. WHITEHEAD,
*Acting Commissioner of Patents.*

Cl. 23—13.